US010628589B2

(12) United States Patent
Werner et al.

(10) Patent No.: US 10,628,589 B2
(45) Date of Patent: Apr. 21, 2020

(54) METHODS, SYSTEMS, AND COMPUTER READABLE MEDIA FOR PREVENTING CODE REUSE ATTACKS

(71) Applicants: The University of North Carolina at Chapel Hill, Chapel Hill, NC (US); The Research Foundation for The State University of New York, Albany, NY (US)

(72) Inventors: Jan Jakub Werner, Chapel Hill, NC (US); Kevin Zachary Snow, Cary, NC (US); Nathan Michael Otterness, Mebane, NC (US); Robert John Dallara, Chapel Hill, NC (US); Georgios Baltas, Seattle, WA (US); Fabian Newman Monrose, Chapel Hill, NC (US); Michalis Polychronakis, Long Island City, NY (US)

(73) Assignees: THE UNIVERSITY OF NORTH CAROLINA AT CHAPEL HILL, Chapel Hill, NC (US); THE RESEARCH FOUNDATION FOR THE STATE UNIVERSITY OF NEW YORK, Albany, NY (US)

( * ) Notice: Subject to any disclaimer, the term of this patent is extended or adjusted under 35 U.S.C. 154(b) by 351 days.

(21) Appl. No.: 15/412,672

(22) Filed: Jan. 23, 2017

(65) Prior Publication Data
US 2017/0213039 A1  Jul. 27, 2017

Related U.S. Application Data

(60) Provisional application No. 62/286,271, filed on Jan. 22, 2016.

(51) Int. Cl.
*G06F 12/00* (2006.01)
*G06F 21/57* (2013.01)
(Continued)

(52) U.S. Cl.
CPC .......... *G06F 21/577* (2013.01); *G06F 12/145* (2013.01); *G06F 21/53* (2013.01); *G06F 21/563* (2013.01); *G06F 2212/1052* (2013.01)

(58) Field of Classification Search
None
See application file for complete search history.

(56) References Cited

U.S. PATENT DOCUMENTS

2009/0222923 A1* 9/2009 Dixon ............... G06F 21/563
726/24

OTHER PUBLICATIONS

Abadi et al., "Control-Flow Integrity Principles, Implementations, and Applications," ACM Transactions on Information and System Security, vol. V, No. N, pp. 1-41 (Feb. 2007).
(Continued)

*Primary Examiner* — Daniel D Tsui
(74) *Attorney, Agent, or Firm* — Jenkins, Wilson, Taylor & Hunt, P.A.

(57) ABSTRACT

Methods, systems, and computer readable media for preventing code reuse attacks are disclosed. According to one method, the method includes executing, on a processor, code in a memory page related to an application, wherein the memory page is protected. The method also includes detecting a read request associated with the code. The method further includes after detecting the read request, modifying, without using a hypervisor, at least one memory permission associated with the memory page such that the code is no longer executable after the code is read.

20 Claims, 7 Drawing Sheets

(51) Int. Cl.
  *G06F 12/14*  (2006.01)
  *G06F 21/56*  (2013.01)
  *G06F 21/53*  (2013.01)

(56) References Cited

OTHER PUBLICATIONS

"ARM Cortex-A57 MPCore Processor," Technical Reference Manual, ARM, pp. 1-554 (2013).
Backes et al., "Oxymoron: Making Fine-Grained Memory Randomization Practical by Allowing Code Sharing," USENIX Security Symposium, pp. 433-447 (Aug. 20-22, 2014).
Backes et al., "You Can Run but You Can't Read:Preventing Disclosure Exploits in Executable Code," ACM Conference on Computer and Communications Security, pp. 1-12 (Nov. 3-7, 2014).
Bittau et al., "Hacking Blind," IEEE Symposium on Security and Privacy, pp. 1-16 (2014).
Blazakis, "Interpreter Exploitation: Pointer Inference and JIT Spraying," Black Hat DC, pp. 1-11 (2010).
Bletsch et al., "Jump-Oriented Programming: A New Class of Code-Reuse Attack," ACM Symposium on Information, Computer and Communications Security, pp. 1-10 (2011).
Brookes et al., "ExOShim: Preventing Memory Disclosure using Execute-Only Kernel Code," International Conference on Cyber Warfare and Security, pp. 1-11 (2016).
Carlini et al., "Control-Flow Bending: On the Effectiveness of Control-Flow Integrity," USENIX Security Symposium, pp. 161-176 (Aug. 12-14, 2015).
Checkoway et al., "Return-Oriented Programming without Returns," Proceedings of the 17th ACM Conference on Computer and Communications Security, ACM, pp. 1-14 (Oct. 4-8, 2010).
Chen et al., "JITDefender: A Defense against JIT Spraying Attacks," IFIP International Information Security Conference, pp. 142-153 (2011).
Crane et al., "Readactor: Practical Code Randomization Resilient to Memory Disclosure," IEEE Symposium on Security and Privacy, pp. 763-780 (2015).
Davi et al., "Isomeron: Code Randomization Resilient to (Just-In-Time) Return-Oriented Programming," Symposium on Network and Distributed System Security, pp. 1-15 (Feb. 8-11, 2015).
Evans et al., "Control Jujutsu: On the Weaknesses of Fine-Grained Control Flow Integrity," Proceedings of the 22nd ACM SIGSAC Conference on Computer and Communications Security, pp. 1-18 (Oct. 12-16, 2015).
Forrest et al., "Building Diverse Computer Systems," Hot Topics in Operating Systems, IEEE Computer Society Press, Los Alamitos, CA, pp. 67-72 (1997).
Gionta et al., "HideM: Protecting the Contents of Userspace Memory in the Face of Disclosure Vulnerabilities," Proceedings of the ACM Conference on Data and Application Security and Privacy, pp. 1-12 (Mar. 2-4, 2015).
Giuffrida et al., "Enhanced Operating System Security Through Efficient and Fine-grained Address Space Randomization," USENIX Conference on Security Symposium, pp. 1-16 (2012).
Hansen, "[PATCH 00/12] [RFC] x86: Memory Protection Keys," pp. 1-2 (May 7, 2015).
Henning, "SPEC CPU2006 Benchmark Descriptions," ACM SIGARCH Computer Architecture News, vol. 34, No. 4, pp. 1-17 (2006).
Hiser et al., "ILR: Where'd My Gadgets Go?," IEEE Symposium on Security and Privacy, pp. 571-585 (2012).
"Best Practices for Paravirtualization Enhancements from Intel® Virtualization Technology: EPT and VT-d," Intel, pp. 1-5 (Jan. 1, 2015).
Kil et al., "Address Space Layout Permutation (ASLP): Towards Fine-Grained Randomization of Commodity Software," Annual Computer Security Applications Conference, pp. 1-10 (2006).
Liu et al., "Launching Return-Oriented Programming Attacks against Randomized Relocatable Executables," IEEE International Conference on Trust, Security and Privacy in Computing and Communications, pp. 1-8 (2011).
Pappas et al., "Smashing the Gadgets: Hindering Return-Oriented Programming Using In-Place Code Randomization," IEEE Symposium on Security and Privacy, pp. 1-15 (2012).
Rohlf et al., "Attacking Clientside JIT Compilers" Black Hat USA, pp. 1-34 (2011).
Schuster et al., "Counterfeit Object-oriented Programming: On the Difficulty of Preventing Code Reuse Attacks in C++ Applications," IEEE Symposium on Security and Privacy, pp. 745-762 (2015).
Serna, "The info leak era on software exploitation," Black Hat USA, pp. 1-45 (2012).
Shacham, "The Geometry of Innocent Flesh on the Bone: Return-into-libc without Function Calls (on the x86)," Proceedings of the 14th ACM Conference on Computer and Communications Security, pp. 1-30 (2007).
Shacham et al., "On the Effectiveness of Address-Space Randomization," ACM Conference on Computer and Communications Security, pp. 1-10 (Oct. 25-29, 2004).
Shin et al., "Recognizing Functions in Binaries with Neural Networks," USENIX Security Symposium, pp. 611-626 (Aug. 12-14, 2015).
Snow et al., "Just-In-Time Code Reuse: On the Effectiveness of Fine-Grained Address Space Layout Randomization," IEEE Symposium on Security and Privacy, pp. 574-588 (2013).
Szekeres et al., "SoK: Eternal War in Memory," IEEE Symposium on Security and Privacy, pp. 48-62 (2013).
Tang et al., "Heisenbyte: Thwarting Memory Disclosure Attacks using Destructive Code Reads," ACM Conference on Computer and Communications Security, pp. 1-12 (Oct. 12-16, 2015).
Thekkath et al., "Architectural Support for Copy and Tamper Resistant Software," International Conference on Architectural Support for Programming Languages and Operating Systems, pp. 1-10 (2000).
Wagner et al., "Mimicry Attacks on Host-Based Intrusion Detection Systems," ACM Conference on Computer and Communications Security, pp. 255-264 (Nov. 18-22, 2002).
Wartell et al., "Differentiating Code from Data in x86 Binaries," Proceedings of the European Conference on Machine Learning and Knowledge Discovery in Databases, pp. 1-16 (2011).
Wartell et al., "Binary Stirring: Self-randomizing Instruction Addresses of Legacy x86 Binary Code," ACM Conference on Computer and Communications Security, pp. 1-12 (Oct. 16-18, 2012).

\* cited by examiner

METHODS, SYSTEMS, AND COMPUTER READABLE MEDIA FOR PREVENTING CODE REUSE ATTACKS

PRIORITY CLAIM

The present application claims the priority benefit of U.S. Patent Application Ser. No. 62/286,271, filed Jan. 22, 2016, the disclosure of which is incorporated herein by reference in its entirety.

GOVERNMENT INTEREST

This invention was made with government support under Grant No. OCI-1127361 awarded by the National Science Foundation. The government has certain rights in the invention.

TECHNICAL FIELD

The subject matter described herein relates to computer security. More specifically, the subject matter relates to methods, systems, and computer readable media for preventing code reuse attacks.

BACKGROUND

Memory disclosure vulnerabilities enable an adversary to successfully mount arbitrary code execution attacks against applications via so-called just-in-time code reuse attacks, even when those applications are fortified with fine-grained address space layout randomization. This attack paradigm requires the adversary to first read the contents of randomized application code, then construct a code reuse payload using that knowledge. While some attempts have been made to prevent code reuse attacks, these attempts fail to prevent just-in-time code reuse attacks.

Accordingly, there exists a need for improved methods, systems, and computer readable media for preventing code reuse attacks.

SUMMARY

Methods, systems, and computer readable media for preventing code reuse attacks are disclosed. According to one method, the method includes executing, on a processor, code in a memory page related to an application, wherein the memory page is protected. The method also includes detecting a read request associated with the code. The method further includes after detecting the read request, modifying, without using a hypervisor, at least one memory permission associated with the memory page such that the code is no longer executable after the code is read.

According to one system, the system includes at least one processor for executing code in a memory page related to an application, wherein the memory page is protected, and a code disclosure protection module (CDPM) implemented using the at least one processor. The CDPM is configured to detect a read request associated with the code and, after detecting the read request, to modify, without using a hypervisor, at least one memory permission associated with the memory page such that the code is no longer executable after the code is read.

The subject matter described herein can be implemented in software in combination with hardware and/or firmware. For example, the subject matter described herein can be implemented in software executed by a processor. In one exemplary implementation, the subject matter described herein may be implemented using a computer readable medium having stored thereon computer executable instructions that when executed by the processor of a computer cause the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the terms "node" and "host" refer to a physical computing platform or device including one or more processors and memory.

As used herein, the term "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
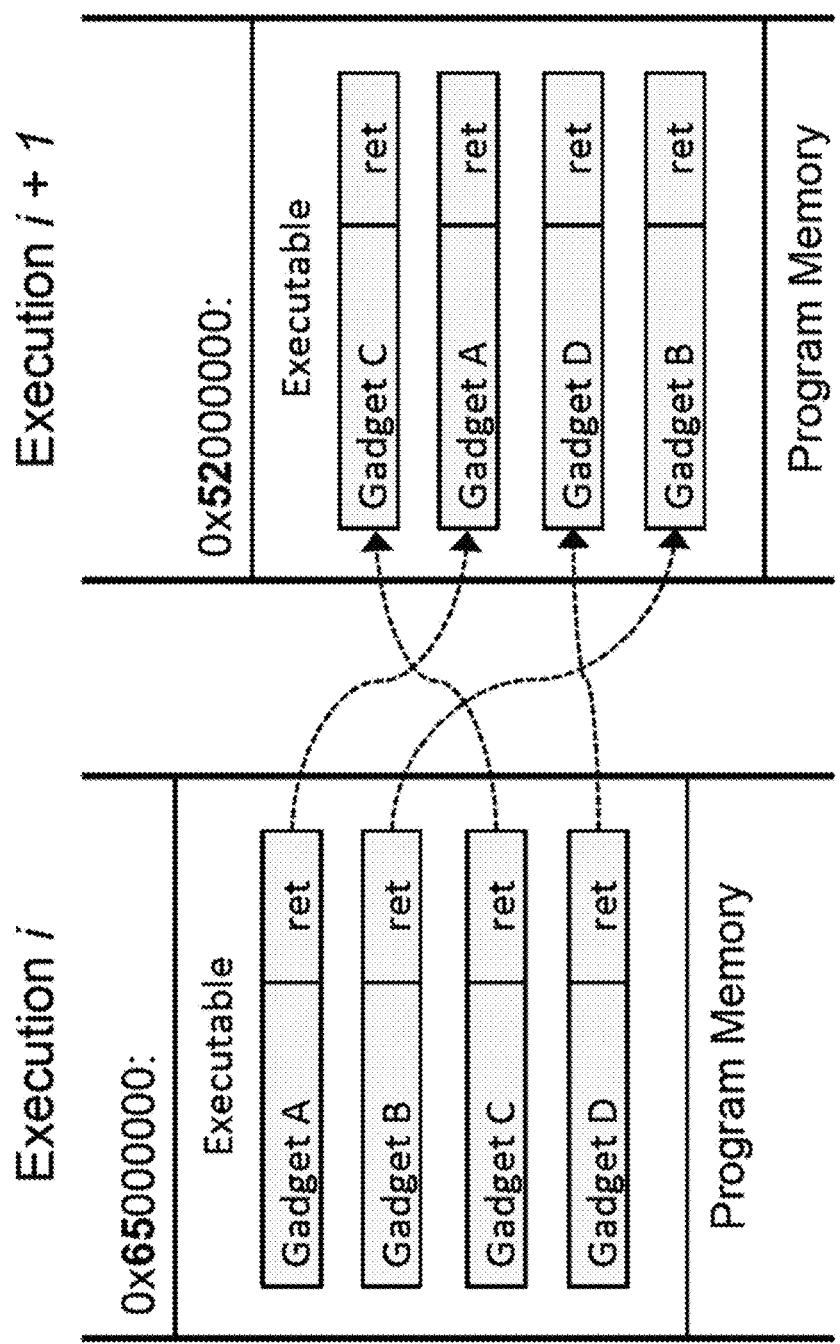
FIG. 1 is a diagram illustrating a fine-grained randomization technique.

The subject matter described herein relates to various aspects associated with preventing code reuse attacks. In some embodiments, designs and implementations of a novel memory permission primitive, referred to herein as No-Execute-After-Read (NEAR), are disclosed. NEAR provides strong security guarantees against just-in-time attacks in commodity binaries. Specifically, NEAR allows all code to be disclosed, but prevents any disclosed code from subsequently being executed, thus fundamentally thwarting just-in-time code reuse. At the same time, commodity binaries with mixed code and data regions still operate correctly, as legitimate data is still readable. To demonstrate the practicality and portability of our approach we implemented prototypes for both Linux and Android on the ARMv8 architecture, as well as a prototype that protects unmodified Microsoft Windows executables and dynamically linked libraries. Advantageously, in addition to NEAR being capable of thwarting memory disclosure attacks, NEAR has been demonstrated to have a negligible runtime overhead, making it suitable for practical deployment.

§ 1. INTRODUCTION

Despite decades of research into application-level defenses, a multitude of vulnerabilities continue to be discovered and exploited in today's feature-rich software ecosystem including web browsers, email clients and document readers. A seemingly endless cycle marches onwards—defenses address known problems, new problems arise or prior assumptions are invalidated, then attacks quickly bypass those previous defenses, ad infinitum. For instance, the no-execute (NX) bit was introduced to prevent the execution of malicious code injection into exploited program memory. As a result, attackers turned to constructing their malicious program logic by chaining together existing code fragments within the exploited program. These code reuse attacks either link together entire functions (i.e., return-to-libc attacks) or combine short instruction sequences (dubbed gadgets) ending with ret, call, or jmp instructions (e.g., assembly language programming instructions or other processor related instructions). In computer security parlance, this is called return-oriented programming (ROP) [31] or jump-oriented programming (JOP) [10, 7], depending on the type of gadgets used. Thus, defenders widely adopted address-space layout randomization (ASLR) over the last decade to obfuscate the location of code necessary to construct these code reuse payloads. In turn, ASLR was bypassed by first leveraging a memory disclosure vulnerability to disclose a code pointer, then using this information to align malicious code pointers with gadgets in the newly discovered code region location.

To address these shortcomings, Kil et al. [25] proposed diversifying software between subsequent runs using one instantiation of what is now called fine-grained randomization. In short, the idea is to not only randomize code region location, but also the functions within those regions, the basic blocks within those functions, as well as the instructions and registers therein. In doing so, leaked function pointers presumably provide too little information to derive the location of useful ROP or JOP gadgets, thus preventing this form of code reuse. Unfortunately, applications have since evolved to commonly provide dynamic features, such as interactive scripting, that fundamentally alter the adversarial model. That is, ASLR depends on the secrecy of code region addresses, but a script controlled by the adversary provides an opportunity for leaking this secret prior to exploitation. Indeed, Snow et al. [34] shed light on a powerful technique for leveraging memory disclosures to leak not just code pointers, but also the code itself by following those pointers and recursively disclosing each discovered page of code. Subsequently, leaked code is inspected, gadgets are identified and a ROP payload is compiled just-in-time (via a process coined JIT-ROP).

Given current insights, randomization alone is not sufficient to fortify applications. Rather than relying on randomization to hide requisite gadgets, over the past several years, the security community has revisited the notion of control-flow integrity (CFI) originally proposed by Abadi et al. [1]. CFI aims to mitigate attacks at the time of the control-flow pivot, e.g., when initially returning to or calling an arbitrary code pointer controlled by the adversary. Just recently, however, Carlini et al. [9] demonstrated that CFI can be defeated (even when considering a "perfect" implementation) by constructing a form of mimicry attack [40] wherein code reuse payloads make use of commonly called library functions. Since these functions are similarly called in normal program operation, control-flow integrity is preserved by these malicious payloads, and thus they fundamentally bypass the CFI protection [15].

While a number of other approaches exist to fortify applications, the just-in-time code reuse paradigm has initiated a resurgence of defenses that adapt and improve fine-grained ASLR-based strategies. For example, recent works [3, 4, 17, 12] have embraced fine-grained ASLR and designed new protections upon it that prevent one from disclosing code in an attempt to prevent just-in-time code reuse. Unfortunately, as we will elaborate on in the next section, these protections either inherently suffer from prohibitively poor runtime performance, have weak or undefined security guarantees, or do not provide binary compatibility to support legacy applications. In the subject matter described herein we instead propose a memory primitive that allows disclosure of code, but prevents the subsequent execution of that code. As we will show, redefining the problem in this way enables us to forgo all the aforementioned shortcomings while still mitigating just-in-time code reuse attacks. Specifically, we make the following contributions in the subject matter described herein:

We provide a new protection primitive, called NEAR, that prevents the execution of previously disclosed code.

We describe a practical design and implementation of the NEAR primitive using commodity hardware, operating systems and applications.

We demonstrate how to leverage the extended page tables (EPT) feature on x86, the upcoming Intel Memory Protection Keys (MPK), and ARMv8 memory permissions—all of which support execute-only memory—to provide NEAR capabilities. We also show how to gracefully handle legitimate data reads in code regions.

Background and pertinent related work is presented in § 2. Some goals and assumptions are presented in § 3, followed by a description in § 4 of the design and implementation of NEAR for various platforms. We provide an extensive evaluation in § 5 to demonstrate the power and practicality of our approach. We conclude in § 6.

§ 2. BACKGROUND AND RELATED WORK

For pedagogical reasons, we first review pertinent concepts, namely fine-grained randomization and just-in-time code reuse attacks, as well as the limitations of related approaches that are crucial to appreciating the concepts proposed in the subject matter described herein.

Address-Space Layout Randomization: The concept of address-space layout randomization dates back to Forrest et al. [16], but the implementations built upon concepts therein (PaX [38], for example) only randomize the location of each memory region as a whole. Unfortunately, these implementations suffer from several serious problems. First, ASLR is susceptible to brute force attacks on 32-bit systems, as the entropy of possible region locations is small [26, 32]. As alluded to earlier, adversaries can also actively take advantage of in-built scripting of applications to defeat this coarse-grained randomization via memory disclosure attacks [30, 35]. In short, one leverages the disclosure vulnerability to reveal the value of a function pointer in a program data section, e.g., function callbacks on the heap, virtual function tables, or return addresses on the stack. One knows the offset from the leaked function pointer to each gadget identified in an offline analysis step. At this point the adversary script adjusts a predefined ROP payload by adding the offset to each gadget pointer in their payload. Fundamentally, leaking the value of a single code pointer in the data section provides enough information for one to infer the location of ROP gadgets.

FIG. 1 is a diagram illustrating a fine-grained randomization technique. Fine-grained randomization, on the other hand, seeks to limit or completely prevent the adversary's ability to infer the location of ROP gadgets given known code pointers, as depicted in FIG. 1. Recently, a plethora of fine-grained ASLR schemes have appeared in the academic literature [27, 21, 42, 18]; each with their own advantages and disadvantages. In general, the underlying idea is to not only randomize the memory region locations, but also to shuffle functions, basic blocks, instructions, registers and even the overall structure of code and data. In general, however, all of the various instantiations of fine-grained randomization achieve their goal of enforcing a policy to prevent the adversary from inferring the location gadgets given knowledge of leaked code pointers. Unfortunately, this policy was shortly thereafter shown to be insufficient in preventing all types of code reuse.

Just-in-Time Code Reuse Attacks: Fine-grained randomization alone, even assuming a perfect implementation, does not prevent all control-flow hijacking attacks that leverage code reuse. Consider, for instance, that a leaked code pointer is not used to infer the location of gadgets, but rather used along with a memory disclosure vulnerability to reveal the actual code bytes at the referenced location [34].

Figure 2:
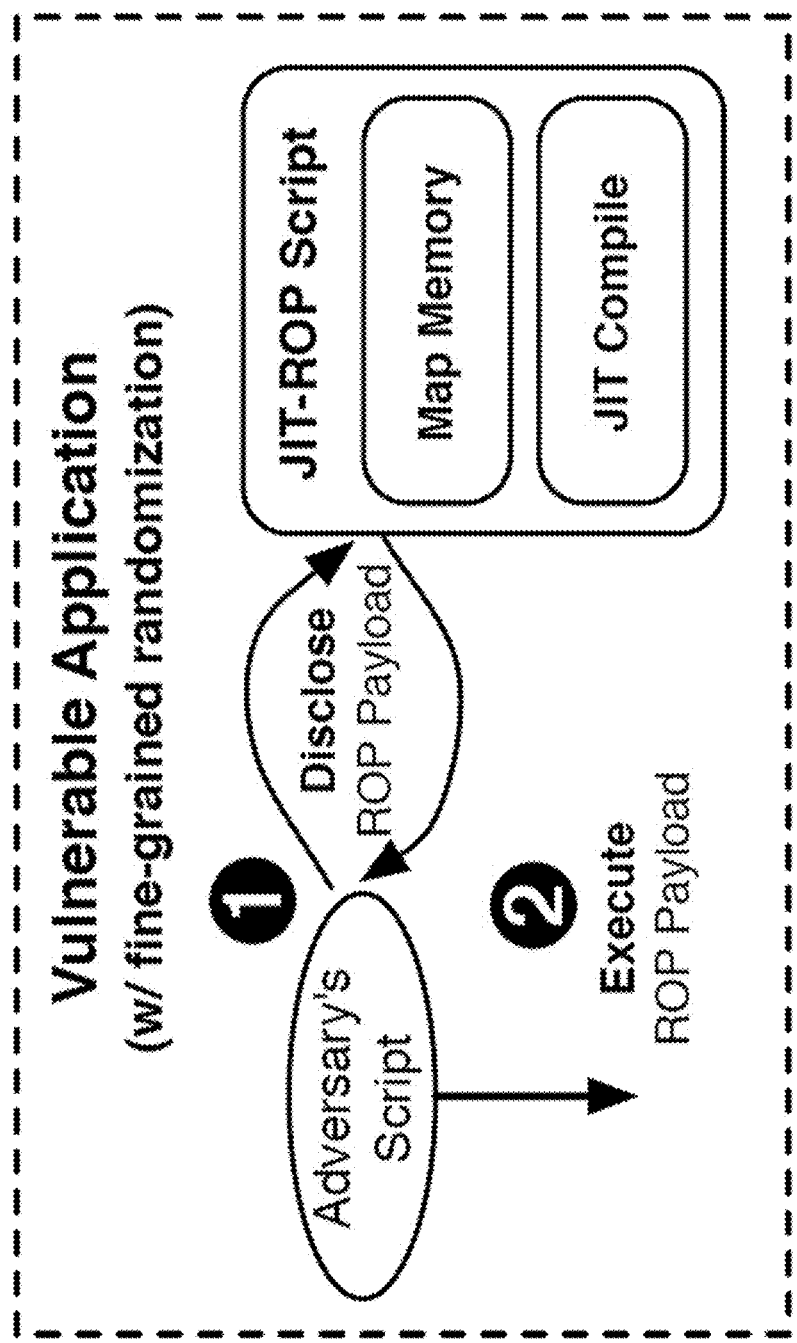
FIG. 2 is a diagram illustrating a just-in-time code reuse attack.

FIG. 2 is a diagram illustrating a just-in-time code reuse attack. As depicted in FIG. 2, the just-in-time code reuse attack uses the initially disclosed code pointer to recursively map out as many code pages as possible in step 1. As it does so, gadgets and system API pointers are identified, then a ROP payload is compiled on-the-spot, during the course of exploitation. The payload is passed back to the adversary script and control-flow is hijacked to execute the payload in step 2. The attack is fundamentally enabled by the adversary's ability to repeatedly leverage a memory disclosure to leak actual code bytes, rather than code pointers alone. The knee-jerk reaction to this attack is to design a method for making code regions executable, but non-readable, thus preventing code disclosure in step 1.

Execute-only Memory: Along these lines, a number of defenses have been proposed to stop attack progression at step 1. Essentially, these defenses revisit the long-standing idea of execute-only memory (XOM) [39] and applying it to contemporary OSes. Backes and Nürnberger [3], for example, propose an approximation of this idea by eliminating all code-to-code pointer references, thus preventing the recursive code memory mapping step of just-in-time code reuse. To do so, a special translation table mediates all function calls. Unfortunately, such an approach requires heavy program instrumentation, and the necessary program transformations are only demonstrated to be achievable via source-level instrumentation. Further, the address of the mediating translation table must remain secret, which is achieved by leveraging x86 segment registers. Not only are segmentation registers being phased out of hardware on the IA-64, but Microsoft Windows already exclusively makes use of the remaining registers for essential operations. Hence, the approach of Backes and Nürnberger [3] has significant drawbacks in compatibility. More concerning is the fact that they fail to address the problem of code pointers on the stack and heap. Davi et al. [13] leverages this weakness to garner enough code pointers on the stack and heap to construct their just-in-time payload in the absence of code-to-code pointers. The work of Davi et al. [13] also describes a strategy for preventing just-in-time code reuse based on code-path randomization, but unfortunately this approach also assumes the existence of secret data regions, which is not necessarily feasible in practice.

To address the aforementioned problems, Backes et al. [4] take a different approach in their most recent work. In that work, the goal is to prevent all code page reads, even assuming the adversary knows the location of these code pages. They note that x86 and ARM architectures do not provide hardware-supported memory permissions that enable one to execute code that is not readable. Thus, their primary challenge lies in designing and implementing a practical software-supported approximation of execute-only memory. In short, their solution is to initially make all code regions inaccessible, which causes a kernel-mode memory fault when code is executed or read. Within the OS fault-handler, they terminate a process if a fault is caused by a code read, while making the page of memory accessible on code execution. The accessible code page is again made inaccessible when a fault occurs on a different page. A security versus performance trade-off is made by allowing a limited number of pages to be accessible at any point in time.

While the concept behind XnR [4] is interesting in theory, it suffers from a number of practical weaknesses that are completely overlooked. Intuitively, multi-threaded applications that make use of many libraries will necessarily jump between code pages (e.g., when switching threads or calling APIs) with a higher frequency than the single-threaded, self-contained, programs used in their evaluation. A much bigger problem, however, is the failure to directly address applications that contain data mixed into the code section, which has significant performance implications. Mixed code and data occur for a number of reasons discussed in § 4. Rather than confronting this challenge directly, XnR instead increments a counter for each first instance of a code page read while decrementing on execution. The application is terminated if some threshold is reached, presumably indicating that too many code page reads have occurred. Not only do the authors fail to provide a threshold value, but this thresholding is ill-conceived.

Gionta et al. [17] approach execute-only memory with consideration for intermixed code and data. To do so, data embedded in code sections is first identified via binary analysis (with symbol information), then split into separate code-only and data-only memory pages. At runtime, instruction executions are directed to the code-only page, while reads are directed to the data-only page. Conditional page direction is implemented by loading split code and data memory caches with different page addresses. One drawback to this approach is that all recent processors now make use of a unified cache, rendering this approach incompatible with modern hardware. Further, static code analysis on binaries is a difficult problem, leaving no other choice but to rely on human intervention to separate code and data in closed-source software. Thus, the security guarantees imbued by this approach are only as reliable as the human in the loop.

Crane et al. [12] approach the problem of execute-only memory by starting with the assumption of source-level access, thus side-stepping the issue of mixed code and data in commodity binaries. Readactor relies on a modified compiler to ensure all code and data is appropriately separated. Execute-only memory is then enforced by leveraging finer-grained memory permission bits made available by extended page tables (EPT). Granted, their approach provides strong enforcement, but is unable to provide binary compatibility to support closed-source software. Even the authors themselves acknowledge this is a significant limitation. Likewise, Brookes et al. [8] also leverage Intel's extended page tables (EPT) to provide an execute-only memory approach (called ExOShim). As it provides protection for kernel code only, however, ExOShim cannot defend against JIT-ROP attacks in user space.

We also note that despite decades of research into application defenses and a torrent of proposed approaches, only a handful of techniques are ever been widely adopted. Szekeres et al. [36] examine the criteria for widespread adoption and find three main factors affecting the outcome: (1) protection, (2) cost and (3) compatibility. Thus, we align our design and implementation with these factors. Specifically, we aim to enforce a strong protection policy that prevents control-flow hijacking with the combination of DEP, fine-grained ASLR and NEAR. Our design ensures an acceptable performance overhead is achievable.

Lastly, we impose a requirement of binary compatibility with modularity support, as Szekeres et al. [36] note that defenses requiring source code, recompilation, or human intervention are impractical, unscalable and too costly. We note that no prior work meets all these criteria. Oxymoron [3] and XnR [4] do not strongly enforce the execute only memory security policy, while the approach of Gionta et al. [17] requires human intervention for closed-source software and Readactor [12] requires source code and recompilation.

§ 3. GOALS AND ASSUMPTIONS

We now turn our attention to some goals and assumptions we impose on our approach. We deliberately attempt to align these goals with the criteria set forth by Szekeres et al. [36] and, in doing so, ensure our approach is practical for widespread adoption. Specifically, we design NEAR to have:

Strong Security Policy: NEAR's security policy may prevent all control-flow hijacking attacks that result in arbitrary code execution.

Strong Security Policy Enforcement: Our approach may guarantee this security policy by using DEP to prevent code injection, fine-grained randomization to prevent code reuse, and NEAR to prevent just-in-time code reuse. Note that NEAR does not prevent code disclosure, but rather prevents the arbitrary code execution that occurs when the adversary attempts to execute their gadgets.

Binary and Module Compatibility: NEAR may protect closed-source commercial off-the-shelf (COTS) binaries without the need for symbols or other debug information. Further, complex multi-threaded applications using shared libraries, such as web browsers and document readers should be fully supported. JIT-ROP operates on such applications, and so must we.

No Human Intervention: NEAR may not require human intervention at any step. Once deployed, any application can be protected without the need for any application-specific pre-computation or manual analysis.

Negligible Performance Overhead: NEAR should have an average performance overhead inline with the recommendations of Szekeres et al. [36]. Memory overhead should be negligible as well.

Application-Wide Protection: The NEAR primitive should be tunable on a per-application basis such that user-specified applications are protected to avoid a system-wide performance penalty.

We make several necessary assumptions in this work to support these goals. In particular, we assume the following application-level defenses are already in place for each protected process:

Non-Executable Memory: We assume that writable data sections of application memory, such as the heap and stack, are non-executable and that executable regions are not writable. This protection is widely available (e.g., called DEP in Windows, or W⊕X in Linux. Thus, one can neither rewrite existing code nor directly inject new code into a protected application.

JIT Mitigations: We assume JIT-spraying [6, 28] mitigations such as JITDefender [11] are in place—that is, one cannot successfully convince an in-built JIT compiler (JavaScript for instance) within the vulnerable application to generate arbitrary malicious logic. Combined with non-executable memory, this assumption ensures that the adversary does not have any avenues for directly injecting malicious code.

Fine-grained ASLR: We assume that fine-grained randomization is in place and that it achieves the stated goal of preventing one from inferring the location of gadgets from a leaked code pointer alone.

On the Necessity of Fine-grained Randomization: We emphasize that the assumption of fine-grained randomization is not unique to our approach. Indeed, all the aforementioned works on execute ⊕ (XOR) read [3, 4, 17, 12] implicitly or explicitly rely on a strong fine-grained randomization implementation. To understand why, consider that the goal of this line of defenses is to prevent one from disclosing instructions on code pages. However, without fine-grained randomization the adversary does not gain any new knowledge from reading the contents of code pages. That is, the use of coarse-grained randomization, which randomizes module locations as a single large block of memory, only forces the adversary to leak the value of a single code pointer from a data region. Gadget locations can then be computed with a relative offset from the disclosed pointer without reading any code page. Thus, any execute ⊕ (XOR) read defense is moot without a strong fine-grained randomization implementation forcing the adversary to disclose code pages. We note, however, that fine-grained randomization is still an active area of research orthogonal to our own work.

Given that non-executable memory and JIT mitigations are already widely deployed, and some practical prototype fine-grained randomization schemes have been described and publicly released [27], we argue that these assumptions are quite realistic. In turn, we define the attacker by assuming an adversary with extraordinary (but achievable) capabilities:

Repeated Memory Disclosure: We assume the adversary can leak the value of any address in the vulnerable application's memory. Moreover, one can repeatedly apply this memory disclosure to reveal an arbitrary number of bytes. We impose no restrictions on how this memory is disclosed, e.g., it could be conveyed through in-built scripting (as with JIT-ROP), leaked over a network service (as with the Heart-Bleed SSL vulnerability), or through some other means.

Memory Map Knowledge: We assume the adversary has a means of learning the overall memory layout of the active instantiation of the vulnerable application. That is, one can use the memory disclosure vulnerability without risk of inadvertently causing a memory access violation when reading an invalid address.

Control-Flow Hijacking: We assume that the adversary can hijack program control-flow, e.g., via overwriting a function return address, virtual table pointer, function callback pointer, or some other means. Further, we assume the adversary can use this hijacking to appropriately perform a stack pivot to attempt to execute any code reuse payload that may be generated.

Next, we describe our approach to achieving the aforementioned goals in face of a capable adversary and argue that in achieving these goals our prototype is the first to be readily adoptable to protect commodity operating system applications.

§ 4. OUR APPROACH

As alluded to earlier, merely forbidding read access to program code regions fails to address the fact that commodity binaries and libraries contain data embedded within their code sections. Indeed, ignoring this challenge leads to a false sense of security. Thus, we take an approach that allows such data to be read, but prevents the subsequent execution of any data read from an executable region. For example, NEAR may ensure the following property: code or data can be executed if and only if it has not been previously read. As a result, gadgets revealed via memory disclosure cannot be later executed, hence preventing just-in-time code reuse. Concurrent with our work, Tang et al. [37] proposed a concept (albeit for the x86 platform only) that shares similar design principles with ours. We return to a comparison later in § 5. While the NEAR principle is simple in theory, a number of challenges need to be overcome, not the least of which is the seeming lack of hardware features to support an efficient design. In what follow, we describe our design and implementation of NEAR to overcome these challenges and meet the goals set forth in § 3.

§ 4.1 Protected Program Workflow

Figure 3:
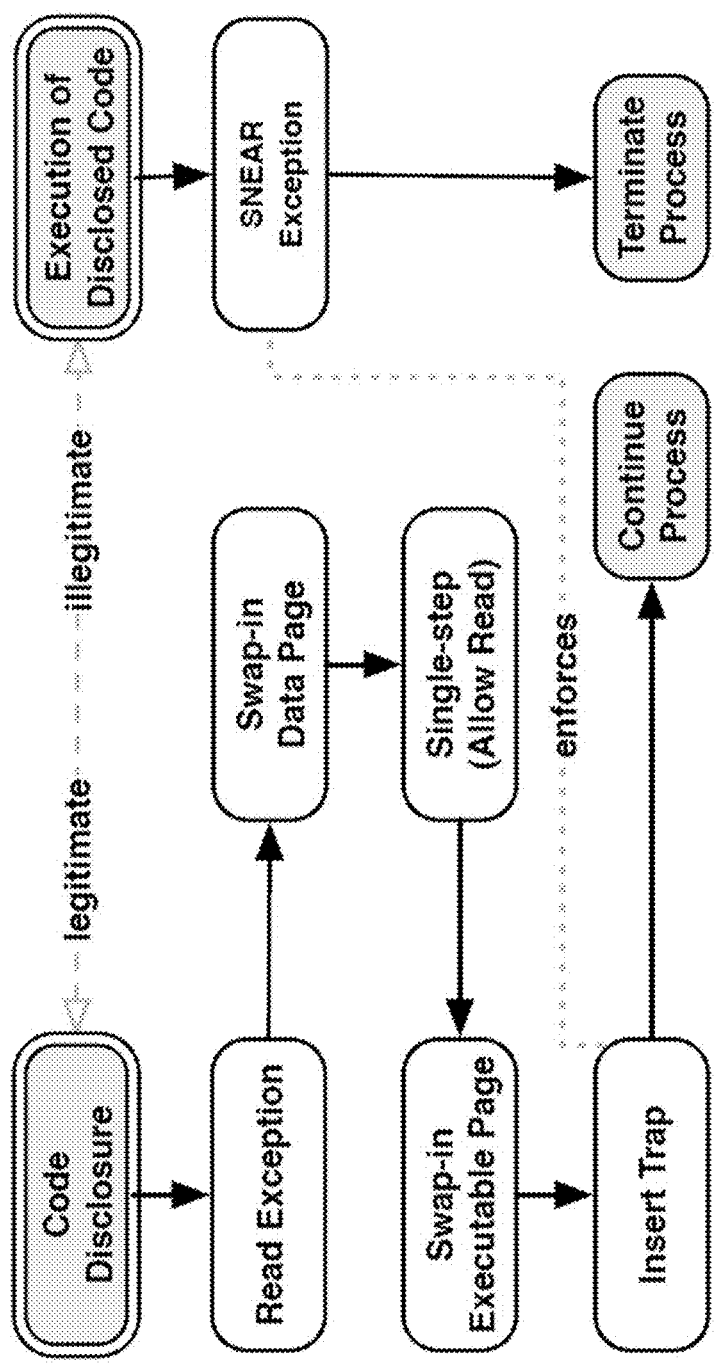
FIG. 3 is a diagram illustrating a no-execute-after-read (NEAR) workflow for enforcing application protection.

Prior to detailing specific hardware features beneficial for our design, we first discuss the overall application workflow we aim to produce with a NEAR-protected application to convey the overall strategy. FIG. 3 is a diagram illustrating a no-execute-after-read (NEAR) workflow for enforcing application protection. In FIG. 3, the overall workflow involves a protected application that makes use of legitimate intermixed code and data and is also exploited by a just-in-time code reuse style attack wherein code is first disclosed, then later executed as a ROP gadget. Beginning with a legitimate code disclosure, the NEAR primitive is notified that the application is attempting to read byte(s) on a code page. As we further elaborate on in the next section, this notification is implemented by forcing a read exception on every code page read. Our security policy is enforced by replacing the data read with invalid opcodes. To do so, we allow the read to occur, then force the CPU to single-step, e.g., via the machine trap flag feature. Upon regaining control, we read application register state and disassemble the instruction that performed the read. The instruction opcode and operands inform our system of the location and the size of the data read. Then, we save the original data bytes read (within a kernel data structure) and overwrite those bytes in application code with invalid opcodes. We call this process the data-swap. As a result, a later execution of those bytes causes an invalid opcode exception and the process is terminated, thus preventing the use of leaked code in a code reuse attack. On the other hand, if those bytes are read again (e.g., due to legitimate program data embedded in the program code region, such as a jump table) we gain control once again through a read exception. At that point we swap the invalid opcodes with the original data and once again use the machine trap flag to allow reading the original data.

Thus, data-swapping enables our system to gracefully handle legitimate embedded data in commodity applications. This does not compromise security because no code byte that is read at any point during process execution can later be executed and used in an attack. However, our approach introduces performance overhead associated with data reads in the code section. Indeed, each byte, word or double word of data that is read leads to costly read exceptions at run time. We examine the cost of data-swaps in § 5, but now turn our attention to techniques for implementing code read exceptions on commodity hardware.

§ 4.2 Code Read Notification

The goal of this step is to provide a mechanism in which our system is notified each time a code page is read. This presents a challenge, as the memory management units available with x86 and x86-64 CPUs do not provide permissions at this granularity. That is, any memory page marked as executable is required to also be readable. Past approaches have proposed marking pages as completely inaccessible to receive kernel-mode faults when code is read (as in the work of Backes et al. [4]). Unfortunately, that approach requires that at least one page, the currently executing page, is available for both execute and read. In practice, more than one page must be made available to remain performant. Further, we seek an approach that does not leave any code accessible to the adversary whatsoever, much less an entire page of code. In what follows, we describe several techniques for implementing code read notification on x86, x86-64, and ARM architectures.

§ 4.2.1 Enforcing NEAR on x86

On this architecture, we take advantage of the fact that read, write, and execute permissions can be individually applied using the dedicated virtual machine extension called extended page tables (EPT) [22]. EPT maps physical memory pages for hardware virtualized guest virtual machines (VMs). (EPT is the part of the virtualization extensions VT-x and VT-d introduced by Intel.) Thus, this approach applies to hardware virtualized VMs, but non-virtualized systems can also leverage EPT by starting a thin hypervisor and transparently virtualizing the running system as the so-called "host domain."

This hypervisor approach, combined with a host-level kernel module, marks physical pages representing the code of protected processes as execute-only. We identify code regions to protect by first hooking the kernel's page fault handler. We use this hook to observe all page faults and identify code pages as they are made available to the process. We note faults that move a page from the not-present state to the present state, have the execute bit set, and belong to a process we wish to protect. When all these conditions occur we instruct the hypervisor to protect the given physical page. We protect the page by marking it as execute-only using EPT.

One problem with this approach is dealing with shared libraries. By protecting a shared page in one process, all other processes using this library would also be protected. Since one goal is to protect a subset of processes, we seek a solution to this problem. At first we attempted to allocate a copy of the faulting page and assign it to the protected process. This approach works on Linux (as a source code modification), but unfortunately the Windows kernel performs checks within strategic memory management functions to verify the consistency of pages used. When an inconsistent state is observed the OS faults and a reboot is required. This path is therefore infeasible without the ability to modify the closed-source Windows kernel. When a not-present fault occurs on Windows, we instead change the fault reason to a write fault and call the system's original fault handler. Since shared pages are marked with copy-on-write (COW), the system fault handler creates a new page copy on our behalf. In doing so, it also handles all the necessary changes to ensure a consistent page-mapping state.

Figure 4:
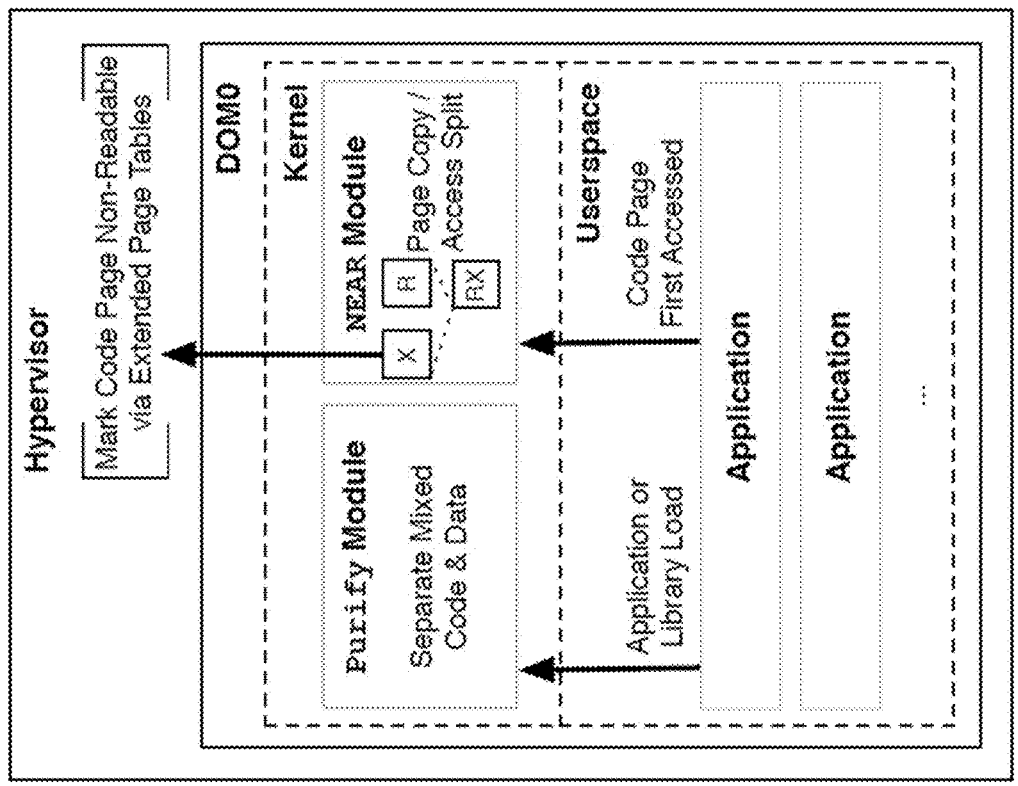
FIG. 4 is a diagram illustrating a technique for using extended page tables to implement support for code read notification on an x86 architecture.

FIG. 4 is a diagram illustrating a technique for using extended page tables to implement support for code read notification on an x86 architecture. In FIG. 4, a high-level overview is depicted for a hypervisor-based approach implementation on x86 Windows. We evaluate the performance of this implementation in § 5. While this approach works in practice, the use of virtualization has performance implications and overly complicates the seemingly simple task of providing code read notifications. Fortunately, upcoming hardware features on the x86-64 architecture offer a more straightforward path towards this goal. Unlike prior work [37, 4, 12], we show how our approach can be readily adapted to other architectures.

§ 4.2.2 Enforcing NEAR on x86-64

Upcoming 64-bit Intel processors include a feature called Memory Protection Keys (MPK) [19], which enables finer-grained control of memory protections by user-space processes. MPKs are applied to individual pages of process memory [23]. There are 16 possible keys, and each key supports enabling or disabling writing and accessing whichever pages it is applied to. As applications are unable to directly modify page tables, they cannot directly change which protection keys are applied to which pages. Applications can, however, modify the meaning of each of the 16 memory protection keys, by writing to an application-accessible 32-bit register, where each key is assigned one bit to enable or disable writing and another bit to enable or disable reading. Of particular importance, however, is that if both bits are cleared instruction fetches are still enabled, making the memory execute-only as long as the pages would have been otherwise executable. Thus, MPKs might provide an alternate mechanism for achieving execute only memory. Unfortunately, at the time of this writing, this hardware is not yet available. Instead, we noted that recent ARM processors include functionally similar features (for our purposes), and thus we implement an ARM version of NEAR to both showcase the portability of our approach and to elaborate on how one could leverage MPKs in the future.

§ 4.2.3 Enforcing NEAR on ARMv8

The ARMv8-A architecture offers several important benefits over earlier ARM processors, but most importantly for NEAR, it is the first version of ARM processors that offers hardware support for execute-only pages. That is, the memory management unit directly supports the ability to mark memory as execute-no-read. This means that NEAR on ARMv8 may require kernel modifications to enable the new protection (that is, no hypervisor is needed). While ARMv8, announced in 2011, is still a relatively new architecture, it is the first 64-bit ARM processor and seems likely to see increased usage in the future as mobile devices have increased processing requirements and support greater amounts of memory. Several devices are already available with ARMv8 processors, including Google's Nexus 9 tablet, which serves as our test platform, and the newest Apple iPad and iPhone devices.

Also of note is the fact that the ARMv8 MMU is usable regardless of whether we build an ARMv7 or ARMv8 version of the application. This means that despite ARMv7 and ARMv8 running in different compatibility modes on ARMv8 [2], applications for both architectures are still using the same memory management unit and have access to the same features. Thus, we can provide NEAR protection for both ARMv7 and ARMv8 applications, so long as the underlying hardware architecture is ARMv8-A.

In summary, the hardware primitives needed to support NEAR are highly portable, and support for these primitives appears to be improving in upcoming hardware revisions.

Unfortunately, all of the primitives for supporting code read notification incur a non-negligible performance overhead in the form of a context-switch on each read, either at the kernel-level for x86-64 and ARMv8, or a virtual machine exit on x86. Therefore, it is imperative that we minimize the total number of code read notifications. To do so, we apply binary code analysis techniques to separate as much code as possible prior to launching an application.

§ 4.3 Separating Mixed Code and Data

The goal of this step is to modify loaded executables on the fly, eliminating data from the executable regions of an application. We call this process purification. This allows us to reduce runtime overhead incurred by programs with mixed code and data protected by NEAR by reducing the total number of code read notifications. Unfortunately, separating code and data on an x86 architecture is provably undecidable [41]. However, a significant amount of research (e.g., the work of Wartell et al. [41] and Shin et al. [33]) has been devoted to applying different mechanisms for correctly disassembling x86 binaries.

Data Separation: We opted for a solution based on binary disassembly with additional guidance from metadata available in executable file headers. We implemented these techniques for x86 Portable Executable (PE) executables and libraries. In short, we identify and relocate function Exports and Imports, jump tables, and local function data that is often embedded in code directly adjacent to the function code (as highlighted by the preceding examples). The Exports directory contains the information about the exported symbols of an image. This data is accessed when a process loads a library and populates the Import Address Table and when a process is dynamically loading a library and looking up a specific symbol (for example using LoadLibrary( ), GetProcAddress). The imports directory contains information about dependencies on external libraries. This data is used during the process load to populate the Import Address Table. The Import Address Table populated during the image load contains pointers to external functions imported from other dynamically linked libraries. The import address table is accessed during the process runtime every time an imported function is called.

Figure 5:
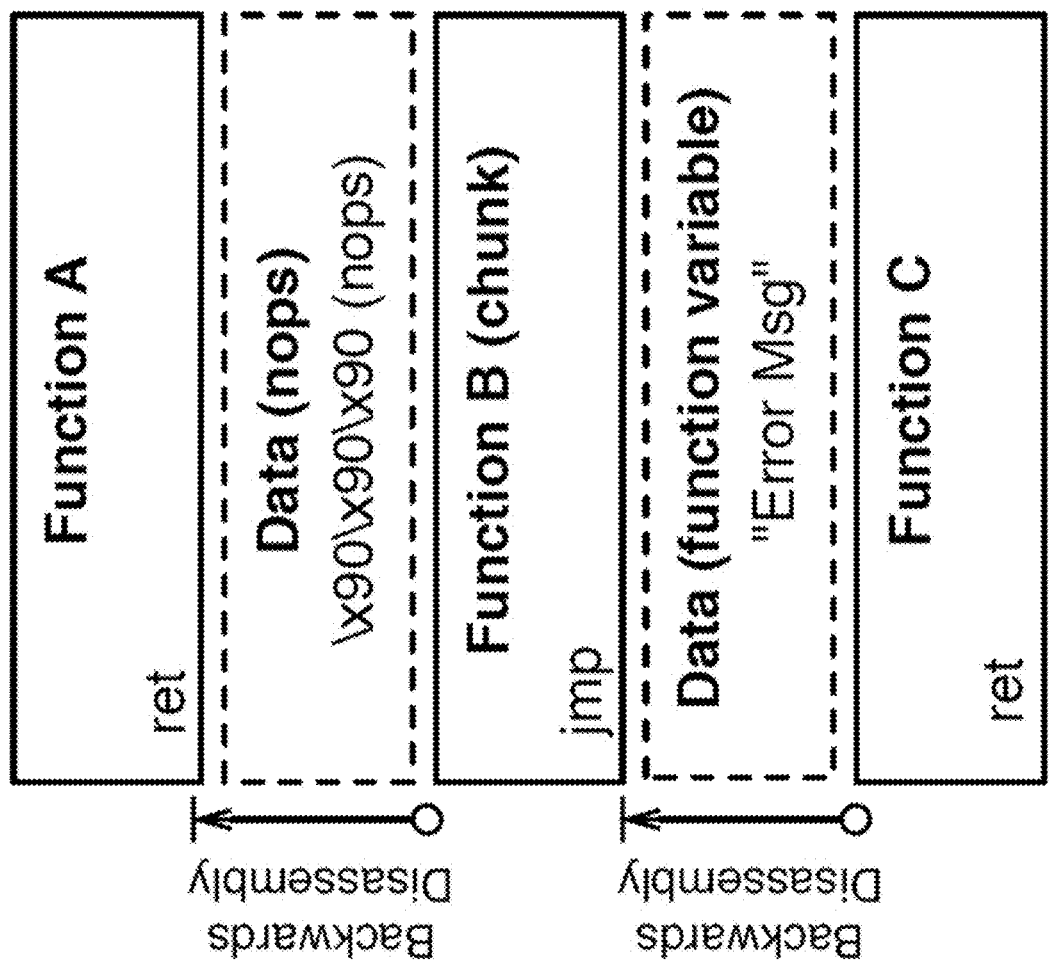
FIG. 5 is a diagram illustrating a backwards disassembly technique for identifying function local variables.

FIG. 5 is a diagram illustrating a backwards disassembly technique for identifying function local variables. In FIG. 5, function local variables are identified by performing a backwards disassembly from function entry points (identified via recursive disassembly) until a control-flow instruction is reached.

Purification of the above mentioned structures depends on the known addresses of the data structures, which is stored in the binary image header. After the relocation of the Export and Import directories and the Import Address Table is complete, the PE header is updated to reflect the added sections and relocated data structures. Details of that process are further discussed in the next section.

Identification of jump tables proved to be more challenging. Jump tables contain the code pointers used to represent C-switch instructions. After inspecting a variety of applications, we observed that the array of pointers generated for a switch statement is usually accessed using the assembly construct of jmp [base+offset*size_of_word]. Jump targets located in the jump table are located in the code section to improve the instruction and data fetch locality. Our jump table search algorithm first scans the code section for clusters of two or more consecutive pointers to the analyzed code section. Those clusters are deemed "candidates." To verify the jump table "candidates" the code section is re-scanned in search for jmp instructions referencing the pointer cluster. Verified jump tables are relocated to a new, read-only section and the address used by the jmp instruction is adjusted to reflect the new location of the jump table. Finally, we identify function-local data by performing a recursive disassembly of the entire binary. First, we identify gaps between known function code. Then, we identify references to data within these gaps and perform a backwards disassembly up to the first possible control-flow instruction (as in FIG. 5), with the idea being that valid code preceding the identified data must invoke a control-flow instruction prior to valid data. We label all bytes between the control-flow instruction and the data reference as data. To relocate the data, we move it to a non-executable section and update any pre-existing references to it to point to that new region. Missing references to the data does not cause program errors, as it is still available for the program to read (but not execute) in its original location; any missed references will incur the performance penalty imbued by the code read notification operation.

In some embodiments, code and data separation heuristics described herein may be improved or further optimized. However, as we show in § 5, the code and data separation heuristics described herein are practical for meeting performance and compatibility goals.

§ 4.4 Platform Integration

To demonstrate the portability and practicality of NEAR on commodity systems, we implemented prototypes on Windows, Linux and Android for x86 and ARMv8. In what follows we detail the engineering of NEAR on each platform to ensure that future research efforts can reproduce our results.

§ 4.4.1 Windows Prototype on x86

This prototype implementation operates on 32-bit Microsoft Windows 7, although nothing prohibits the overall approach from functioning on other platforms, e.g., Linux or with a 64-bit architecture. For simplicity, NEAR is implemented with two Windows kernel modules—the hypervisor module and the purification module. The hypervisor module implements a thin hypervisor that supports running the host as a "host domain," as described in § 4.2. In addition to providing the hypervisor functionality, this module also hooks the system fault handler by installing a JMP hook at the MmAccess-Fault function entry. The Capstone library provides kernel-mode disassembly which we used to determine the operand size of code read operations. Protected processes are configured via a Registry key entry specifying executable names to protect and, when started, are tracked at runtime via their process ID. The hypervisor module is composed of 2824 lines of new kernel-level C code.

The purification module handles all separation of mixed code and data as described in § 4.3. As previously alluded to, we implemented purification as a kernel module in order to provide this functionality on-the-fly as processes and shared libraries are loaded. This on-load functionality is essential to its practicality, as manually purifying each binary and library offline (as done in Heisenbyte [37]) is prohibitive, due to possible human errors and sheer volume of binaries requiring purification. This module triggers its code purification routine using hooks on ZwCreateFile, ZwOpen-File, ZwCreateSection, ZwOpenSection and ZwMapViewOfSection system calls. The hooks are installed by replacing their entries in the System Service Descriptor Table (SSDT). NTDLL is purified early in the boot process by hooking PspLocateSystemDll with a JMP instruction at function entry. To do so, we replace the given location string with a path leading to our purified version of NTDLL. Finally, since the Windows kernel verifies integrity of loaded libraries, we temporarily disable these checks when loading a purified library by toggling the g_CiEnabled kernel variable. The purification module consists of 2500 lines of new kernel-level C code.

§ 4.4.2 Android and Linux Prototype on ARM

To implement code read notification on ARMv8-A, we patched the Linux and Android (for Nexus 9) kernels to make use of the execute-only permission. To do so, we defined the execute-no-read permission bits in pgtable.h and modified the mprotect function to support the use of that definition. We also patch the page fault handler (the function do_page_fault in fault.c) and single-step handler (the function single_step_handler in debug_monitors.c) to handle code reads similar to the Windows implementation. As an optimization, we forgo single-stepping following most code reads and instead opt for emulating the read operation. In our proof-of-concept, we opted to implement the subset of memory read instructions that appeared most frequently at runtime in popular applications (namely, LDR unsigned immediate and literal). The simplicity of the ARM architecture makes this feature relatively easy to implement using Capstone and, as a result, we significantly reduced the number of read notification fault.

To protect native code as it is loaded, as in the Windows implementation, we modify the memory mapping library (the function do_mmap_pgoff in mmap.c) to automatically mark any executable region with the execute-no-read permission. The parts of the Android kernel source code responsible for memory management are the same as their counterparts in the Linux kernel, so we apply the patch directly to both OS's source code and recompile the Linux and Android kernels.

§ 5. EVALUATION

For the experiments that follow, we evaluated our approach using a 32-bit version of Windows 7 Professional on a Dell Optiplex 990 powered by an Intel Core i7 CPU running at 3.4 GHz with 4 GB of RAM. The system was configured to use one physical core.

Recall that one goal is to provide a strong security guarantee wherein previously disclosed executable memory can not be executed. To test that the desired functionality was achieved, we implemented a naïve application that first reads memory from a location leaked via a memory disclosure and then attempts to directly invoke the function whose pointer was previously disclosed. Since the NEAR protection replaces the disclosed code with a HLT instruction, the operating system terminates the process raising the General Protection Fault (GPF) as soon as the control is transferred. Next, to further evaluate our ability to thwart advanced memory disclosure attacks, a JIT-ROP style attack that defeats XnR is applied. In this case, Internet Explorer 10 and its prerequisite DLLs were protected using NEAR. The attack fails as soon as JIT-ROP [34] enters step 2 of FIG. 2.

The purification process separates different types of data embedded in the executable sections of programs. To gauge the impact that moving the different classes of data regions had on our runtime performance we re-examined all the CPU-SPEC 2006 benchmark programs. Curiously, we found that Imports and Exports directories and Import Address Tables were not present in the executable sections of these programs. This is because the C compiler provided with Microsoft Visual Studio 2013 places the aforementioned objects in a read-only section. Additionally, to our surprise, we observed no initialized data embedded in the text section of the benchmark binaries (unlike some of real-world libraries (e.g., cryptbase.dll and libmozglue.so)). Jump tables, on the other hand, were prevalent, and their movement had a significant impact on our runtime performance.

Table 2 show the impact of purification on the selected programs. Table 2 shows the number of jump tables that were found and purified by our discovery algorithm (see § 4.3), their size in bytes, and the number of EPT faults triggered by a purified versus non-purified binary. The reason for the significant amount of faults triggered by h264ref benchmark was explained in § 4.3. Notice that for the sjeng benchmark the amount of EPT faults was reduced by six orders of magnitude which directly translates into a reduction in runtime overhead from 4084.7% to 1.10%.

TABLE 1

| Benchmark | EPT faults pre-purify | EPT faults post-purify | Jump tables | Purified bytes |
|---|---|---|---|---|
| 400.perlbench | 1.7B | 164,495 | 183 | 12651 |
| 401.bzip2 | 2.5M | 136,623 | 18 | 544 |
| 403.gcc | 600M | 2.3M | 1067 | 73927 |
| 429.mcf | 175,562 | 2376 | 14 | 320 |
| 445.gobmk | 1.1M | 127,343 | 51 | 2770 |
| 456.hmmer | 2.5M | 1.6M | 28 | 1012 |
| 458.sjeng | 1.6B | 2405 | 31 | 948 |
| 464.h264ref | 317M | 25M | 33 | 828 |
| 471.omnetpp | 2.2M | 100,349 | 38 | 1285 |
| 473.astar | 689,231 | 322,440 | 15 | 376 |
| 483.xalancbmk | 1.7B | 3.3M | 146 | 5437 |
| IE v10 | 16.6M | 5.9M | 1926 | 106679 |

TABLE 2

| CPU SPEC benchmark | Heisenbyte (enforcement) | NEAR (enforcement) |
|---|---|---|
| 400.perlbench | 61.57% | 3.04% |
| 401.bzip2 | 0.0% | 1.21% |
| 403.gcc | 35.64% | 19.88% |
| 429.mcf | 19.26% | 4.04% |
| 445.gobmk | 0.85% | 0.99% |
| 456.hmmer | 6.86% | 1.81% |
| 458.sjeng | 1.06% | 1.10% |
| 464.h264ref | 0.23% | 7.63% |
| 471.omnetpp | 11.44% | 2.32% |
| 473.astar | 5.41% | 2.13% |
| 483.xalancbmk | 36.15% | 5.51% |
| Average: | 16.48% | 5.72% |

Table 3 provides a performance comparison to the concurrent work reported by Tang et al. [37]. Our performance is significantly better than that of Heisenbyte, which we attribute to our efforts to better understand the intricacies of code and data intermingling, and take action to rectify that impact whenever possible. Our overhead ranges from 0.99% (for 445.gobmk) to 19.88% (gcc). To provide the reader with a better feel for the overhead of NEAR on real-world applications, we used an online browser benchmarking tool known as Peacekeeper. The Peacekeeper benchmark measures the performance of several aspects of a browser, including how quickly it renders HTML5 video, how well it performs 3D rendering, the speed of commonly used text parsing operations, and the time it takes to navigate to dynamically generated pages. In short, the Peacekeeper benchmark tests measure the browser's ability to render and modify specific elements used in typical web pages, and do so by manipulating the DOM tree in real-time. The results in Table 4 show that our overhead (of 4:7%, on average) is barely noticeable for common browser-related tasks.

TABLE 3

| Peacekeeper Benchmark | Baseline | NEAR Enforcement | % overhead |
|---|---|---|---|
| Internet Explorer 10 | 2133 | 2020 | 5.2% |
| Google Chrome v45.0.2454 | 3963 | 3788 | 4.4% |
| Mozilla Firefox v41.0.11 | 4719 | 4285 | 4.6% |

Lastly, our empirical results in Table 5 show that NEAR incurs a modest memory overhead for protected processes. Recall that each executable page of a protected process must have a read-only copy created when the page is first rolled into memory. In the set of tested applications, we observed between 100 and 500 additional pages of memory created per process, which is insignificant when observed in the context of the size of the working set of these processes (i.e., from 60 to 933 megabytes).

TABLE 4

| CPU SPEC benchmark | Total memory (kB) | Allocated due to NEAR (kB) |
|---|---|---|
| 400.perlbench | 594,944 | 1352 (0.22%) |
| 401.bzip2 | 876,544 | 448 (0.05%) |
| 403.gcc | 954,368 | 1828 (0.19%) |
| 429.mcf | 864,256 | 424 (0.04%) |
| 445.gobmk | 29,696 | 1072 (3.6%) |
| 456.hmmer | 61,440 | 596 (0.97%) |
| 458.sjeng | 184,320 | 488 (0.26%) |
| 464.h264ref | 69,632 | 764 (1.09%) |
| 471.omnetpp | 124,928 | 1108 (0.88%) |
| 473.astar | 320,512 | 520 (0.16%) |
| 483.xalancbmk | 348,160 | 1628 (0.46%) |

§ 6. CONCLUSION

We present a novel technique that prevents the execution of previously disclosed code. Our approach, dubbed No-Execute-After-Read (NEAR) thwarts a dominant class of attacks that rely on memory disclosures to disassemble code in memory in order to build a code-reuse attack [34]. We showed how using existing hardware primitives for x86 processors—as well as upcoming hardware support for ARMv8 memory permissions and recently introduced Intel Memory Protection Keys—NEAR can meet the three main factors that limit the wide spread adoption of security technologies [36]. Our protection is based on a strong security foundation, and our runtime overhead is comparable to, or better than, contemporary approaches that also aim to thwart memory disclosure attacks.

Figure 6:
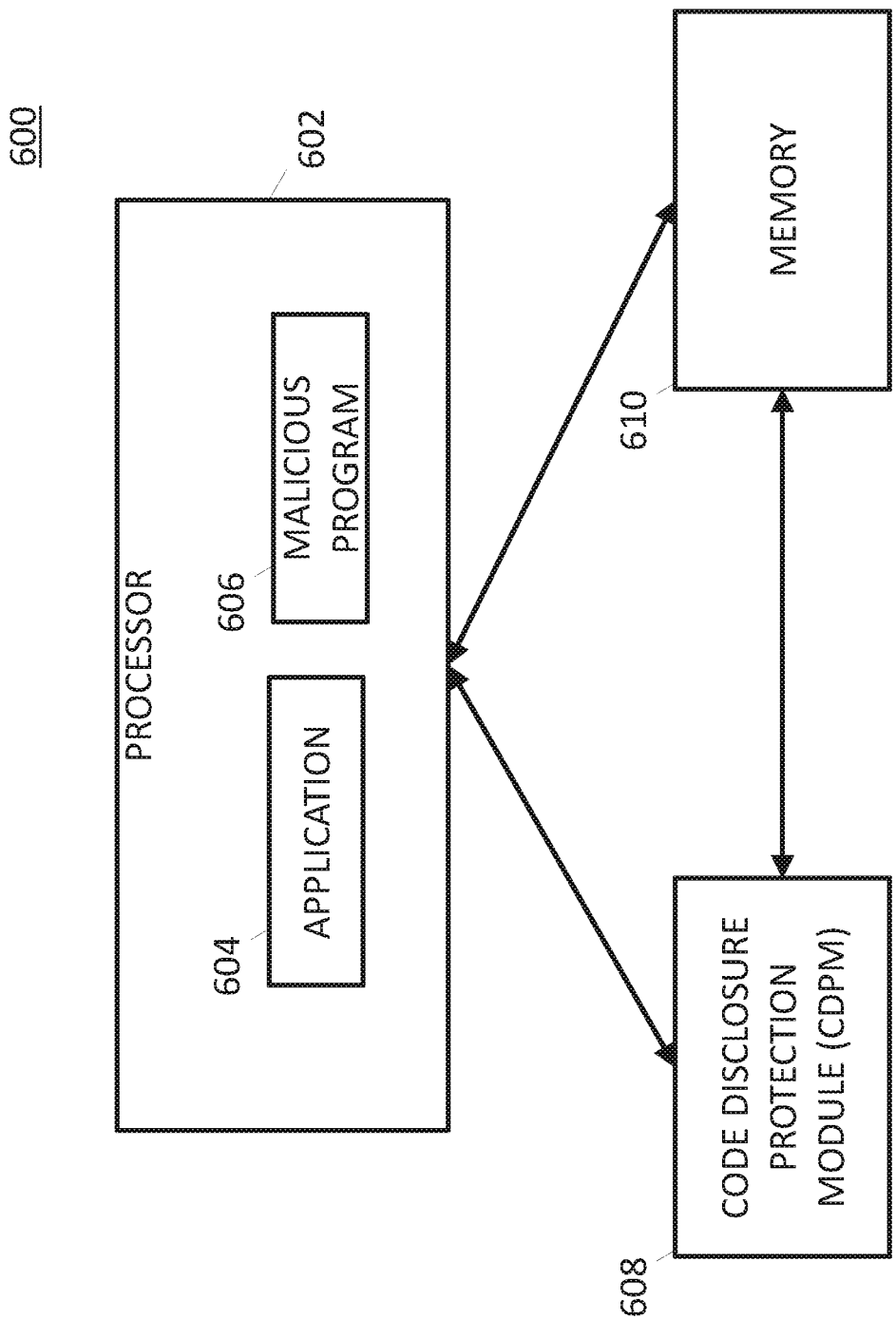
FIG. 6 is a diagram illustrating a computing environment for preventing code reuse attacks according to an embodiment of the subject matter described herein.

FIG. 6 is a diagram illustrating a computing environment 600 for preventing code reuse attacks according to an embodiment of the subject matter described herein. Referring to FIG. 6, a computing environment 600 may represent various computing architectures, such as an x86 architecture, an x86-64 architecture, an ARM architecture, or other architectures. In some embodiments, computing environment 600 may include one or more computing platforms. Computing environment 600 may include at least one processor 602, a code disclosure protection module (CDPM) 608, and a memory 610.

Processor 602 may represent one or more physical processors, such as an x86 based processor, an x86-64 based processor, an ARM processor, or another processor. Processor 602 may execute various applications and/or programs, including application 604 and malicious program 606.

Application 604 may represent commodity software, such as a web browser, and may utilize various executable binaries, such as dynamic linked library (dll) files, for performing various functions. Malicious program 606 may represent a script or other program designed to perform a code reuse attack by attempting to exploit code disclosure vulnerabilities associated with computing environment 600 and/or processor 602. For example, malicious program 606 may attempt to obtain code information (e.g., code pointers and code instructions) from application 604 or executable binaries used by application 604 so as to identify gadgets (e.g., code portions) that can be used in a code reuse attack.

Memory 610 may represent any suitable entity (e.g., non-transitory computer readable media, etc.) for storing code and data associated with application 604 and malicious program 606. Memory 610 may utilize various memory protection techniques, e.g., fine-grained memory randomization, memory protection keys, and/or memory protection primitives. Processor 602 may utilize memory 610 by accessing memory pages (e.g., 4 kilobytes (KB) or larger portions of memory).

In some embodiments, processor 602 may interact with CDPM 608. CDPM 608 may represent any suitable entity (e.g., one or more kernel based modules, a memory protection unit, etc.) for providing memory protection and/or for facilitating memory reads and writes to memory 610. In some embodiments, CDPM 608 may implement various functionalities described herein related to NEAR enforcement. For example, CDPM 608 may enforce that a memory page or code therein can be read but is not executable afterwards.

In some embodiments, CDPM 608 may utilize one or more mechanisms for identifying when an application is attempting to read a code page (e.g., a memory page). For example, CDPM 608 may be notified that application 604 is attempting to read byte(s) on a memory page (e.g., from memory 610). In this example, CDPM 608 may implement notification by forcing a read exception on every code page read. In this example, after allowing the read to occur, processor 602 may single-step, e.g., via a machine trap flag feature.

In some embodiments, to enforce NEAR, CDPM 608 may perform a data-swap that involves modifying code after it has being read. For example, after a read has occurred, CDPM 608 may analyze application register state and may identify the instruction that performed the read. In this example, an instruction opcode and related operands may indicate the location and the size of the data read. CDPM 608 may save the original data bytes read (e.g., within a kernel data structure or in memory 610) and may overwrite those bytes in application code with invalid opcodes. By modifying the read code, a later execution of those bytes causes an invalid opcode exception and the process is terminated, thus preventing the use of leaked code in a code reuse attack.

In some embodiments, CDPM 608 may perform a second data-swap to allow legitimate access to program data (e.g., due to legitimate program data embedded in the program code region, such as a jump table). For example, after performing a first data-swap that changes read code to invalid code, a second read request for the code may be received. In this example, CDPM 608 may gain control once again through a read exception. At that point, CDPM 608 may swap the invalid code with the original code and once again use the machine trap flag to allow reading of the original data.

It will be appreciated that FIG. 6 is for illustrative purposes and that various nodes, their locations, and/or their functions may be changed, altered, added, or removed. For example, some nodes and/or functions may be combined into a single entity or some functionality (e.g., in CDPM 608) may be separated into separate nodes or modules.

Figure 7:
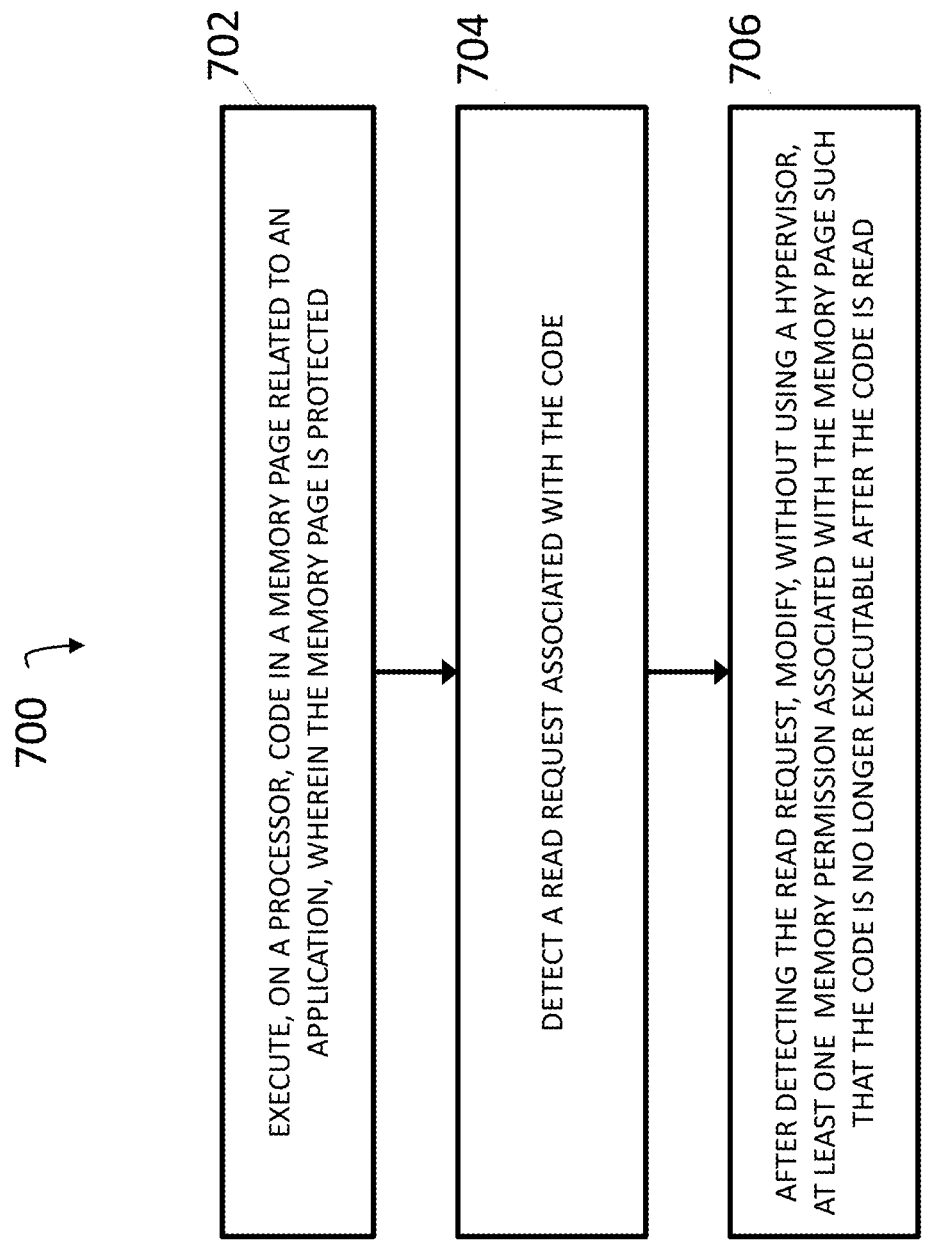
FIG. 7 is a diagram illustrating a process for preventing code reuse attacks according to an embodiment of the subject matter described herein.

FIG. 7 is a diagram illustrating a process 700 for preventing code reuse attacks according to an embodiment of the subject matter described herein. In some embodiments, process 700, or portions thereof (e.g., steps 702, 704 and/or 706, may be performed by or at processor 602, CDPM 608, and/or another node or module. For example, CDPM 608 may include or communicate with a memory management unit. In this example, CDPM 608 may convert virtual addresses into physical addresses and may obtain memory pages from memory 610. Continuing with this example, CDPM 608 may enforce memory protection using memory protection keys and/or memory protection primitives, e.g., by allowing execution but not after the code is read (e.g., NEAR).

Referring to process 700, in step 702, executing, on a processor, code in a memory page related to an application, wherein the memory page is protected.

In step 704, a read request associated with the code may be detected. For example, malicious program 606 may use a heap vulnerability associated with processor 602 to trigger a read request for disclosing code being executed. In this example, the read request may be an attempt to gather information (e.g., gadget locations) for compiling a just-in-time code reuse attack.

In some embodiments, detecting a read request associated with the code may include triggering a read exception or a fault for every memory page read.

In step 706, after detecting the read request, at least one memory permission associated with the memory page may be modified such that the code is no longer executable after the code is read. For example, modifying a memory permission may include modifying one or more bits of a memory register or a memory protection key.

In some embodiments, modifying at least one memory permission associated with the memory page such that code is no longer executable after the code is read may be performed with or without using a hypervisor.

In some embodiments, a memory protection technique or process may include performing a read request and, after performing the read request, modifying read code by changing at least one opcode in the read code.

In some embodiments, a memory permission may include a memory permission primitive of execute-no-read.

In some embodiments, prior to executing an executable binary or code, at least one data portion may be separated from an executable binary containing mixed executable code and data portions. For example, an executable binary may separate different portions into a read-only portion and an executable portion. For example, application 104 may use an executable binary, such as cryptbase.dll, for providing various encryption routines and may include mixed executable and data portions that can be utilized in a just-in-time code reuse attack.

In some embodiments, separating at least one data portion from an executable binary may include identifying and relocating function exports, function imports, jump tables, or local function variables.

In some embodiments, identifying local function variables may include identifying gaps between known function code, after identifying the gaps, identifying references to data within these gaps, and performing a backwards disassembly to a first control-flow instruction.

In some embodiments, identifying jump tables may include scanning a code section for clusters of two or more consecutive pointers in the code section and, for each cluster, scanning the code section for a jmp instruction referencing a pointer associated with the cluster.

It should be noted that CDPM 608 and/or functionality described herein may constitute a special purpose computing device (e.g., a memory protection kernel module, a hardware-implemented memory protection unit, or a memory protection chip). Further, CDPM 608 and/or functionality described herein can improve the technological field of network security and/or computer security by providing mechanisms for preventing code reuse attacks by using a memory protection primitive that allows code to be read (by an application or script) but not executed afterwards. As such, various techniques and/or mechanisms described herein can detect and/or prevent malicious activity (e.g., just-in-time code reuse attacks) while also having a negligible overhead which allows for practical deployment.

The disclosure of each of the following references is incorporated herein by reference in its entirety.

REFERENCES

[1] M. Abadi, M. Budiu, U. Erlingsson, and J. Ligatti, "Controlflow integrity principles, implementations, and applications," ACM Transactions on Information and Systems Security, vol. 13, no. 1, pp. 1-40, 2009.

[2] ARM Cortex-A57 MPCore Processor Technical Reference Manual, ARM, 2013.

[3] M. Backes and S. Nürnberger, "Oxymoron: Making fine-grained memory randomization practical by allowing code sharing," in USENIX Security Symposium, 2014, pp. 433-447.

[4] M. Backes, T. Holz, B. Kollenda, P. Koppe, S. Nürnberger, and J. Pewny, "You can run but you can't read: Preventing disclosure exploits in executable code," in ACM Conference on Computer and Communications Security, 2014, pp. 1342-1353.

[5] A. Bittau, A. Belay, A. Mashtizadeh, D. Mazières, and D. Boneh, "Hacking blind," in IEEE Symposium on Security and Privacy, 2014, pp. 227-242.

[6] D. Blazakis, "Interpreter exploitation: Pointer inference and jit spraying," in Black Hat DC, 2010.

[7] T. K. Bletsch, X. Jiang, V. W. Freeh, and Z. Liang, "Jumporiented programming: a new class of code-reuse attack." in ACM Symposium on Information, Computer and Communications Security, 2011.

[8] S. Brookes, R. Denz, M. Osterloh, and S. Taylor, "Exoshim: Preventing memory disclosure using execute-only kernel code," in International Conference on Cyber Warfare and Security, 2016, p. To appear.

[9] N. Carlini, A. Barresi, M. Payer, D. Wagner, and T. R. Gross, "Control-flow bending: On the effectiveness of control-flow integrity," in USENIX Security Symposium, 2015, pp. 161-176.

[10] S. Checkoway, L. Davi, A. Dmitrienko, A.-R. Sadeghi, H. Shacham, and M. Winandy, "Return-oriented programming without returns," in Proceedings of the 17th ACM conference on Computer and communications security. ACM, 2010, pp. 559-572.

[11] P. Chen, Y. Fang, B. Mao, and L. Xie, "JITDefender: A defense against jit spraying attacks," in IFIP International Information Security Conference, 2011, pp. 142-153.

[12] S. Crane, C. Liebchen, A. Homescu, L. Davi, P. Larsen, A.-R. Sadeghi, S. Brunthaler, and M. Franz, "Readactor: Practical code randomization resilient to memory disclosure," in IEEE Symposium on Security and Privacy, 2015, pp. 763-780.

[13] L. Davi, C. Liebchen, A.-R. Sadeghi, K. Z. Snow, and F. Monrose, "Isomeron: Code randomization resilient to (just-intime) return-oriented programming," in Symposium on Network and Distributed System Security, 2015.

[14] S. Designer, "return-to-libc attack," Bugtraq, August, 1997.

[15] I. Evans, F. Long, U. Otgonbaatar, H. Shrobe, M. Rinard, H. Okhravi, and S. Sidiroglou-Douskos, "Control jujutsu: On the weaknesses of fine-grained control flow integrity," in Proceedings of the 22Nd ACM SIGSAC Conference on Computer and Communications Security, 2015, pp. 901-913.

[16] S. Forrest, A. Somayaji, and D. Ackley, "Building diverse computer systems," in Hot Topics in Operating Systems, 1997, p. 67.

[17] J. Gionta, W. Enck, and P. Ning, "Hidem: Protecting the contents of userspace memory in the face of disclosure vulnerabilities," in Proceedings of the ACM Conference on Data and Application Security and Privacy, 2015, pp. 325-336.

[18] C. Giuffrida, A. Kuijsten, and A. S. Tanenbaum, "Enhanced operating system security through efficient and fine-grained address space randomization," in USENIX Security Symposium, 2012, pp. 475-490.

[19] D. Hansen. (2015) [RFC] x86: Memory protection keys.

[20] J. L. Henning, "SPEC CPU2006 Benchmark Descriptions," ACM SIGARCH Computer Architecture News, vol. 34, no. 4, pp. 1-17, 2006.

[21] J. D. Hiser, A. Nguyen-Tuong, M. Co, M. Hall, and J. W. Davidson, "ILR: Where'd my gadgets go?" in IEEE Symposium on Security and Privacy, 2012, pp. 571-585.

[22] Best Practices for Paravirtualization Enhancements from Intel Virtualization Technology: EPT and VT-d, Intel, 2015.

[23] Intel R 64 and IA-32 Architectures Software Developer's Manual: Combined Volumes 1, 2A, 2B, 2C, 3A, 3B and 3C, Intel, 2015.

[24] Intel VTune Amplifier 2016, Intel, 2015.

[25] C. Kil, J. Jun, C. Bookholt, J. Xu, and P. Ning, "Address space layout permutation (ASLP): Towards fine-grained randomization of commodity software," in Annual Computer Security Applications Conference, 2006, pp. 339-348.

[26] L. Liu, J. Han, D. Gao, J. Jing, and D. Zha, "Launching return-oriented programming attacks against randomized relocatable executables," in IEEE International Conference on Trust, Security and Privacy in Computing and Communications, 2011, pp. 37-44.

[27] V. Pappas, M. Polychronakis, and A. D. Keromytis, "Smashing the gadgets: Hindering return-oriented programming using in-place code randomization," in IEEE Symposium on Security and Privacy, 2012, pp. 601-615.

[28] C. Rohlf and Y. Ivnitskiy, "Attacking clientside JIT compilers," in Black Hat USA, 2011.

[29] F. Schuster, T. Tendyck, C. Liebchen, L. Davi, A.-R. Sadeghi, and T. Holz, "Counterfeit object-oriented programming: On the difficulty of preventing code reuse attacks in c++ applications," in IEEE Symposium on Security and Privacy, 2015, pp. 745-762.

[30] F. J. Serna, "The info leak era on software exploitation," in Black Hat USA, 2012.

[31] H. Shacham, "The geometry of innocent flesh on the bone: Return-into-libc without function calls (on the x86)," in Proceedings of the 14th ACM conference on Computer and communications security. ACM, 2007, pp. 552-561.

[32] H. Shacham, E. jin Goh, N. Modadugu, B. Pfaff, and D. Boneh, "On the effectiveness of address-space randomization," in ACM Conference on Computer and Communications Security, 2004, pp. 298-307.

[33] E. C. R. Shin, D. Song, and R. Moazzezi, "Recognizing functions in binaries with neural networks," in USENIX Security Symposium, 2015, pp. 611-626.

[34] K. Z. Snow, F. Monrose, L. Davi, A. Dmitrienko, C. Liebchen, and A.-R. Sadeghi, "Just-in-time code reuse: On the effectiveness of fine-grained address space layout randomization," in IEEE Symposium on Security and Privacy, 2013, pp. 574-588.

[35] A. Sotirov and M. Dowd, "Bypassing browser memory protections in Windows Vista," 2008.

[36] L. Szekeres, M. Payer, T. Wei, and D. Song, "SOK: Eternal War in Memory," in IEEE Symposium on Security and Privacy, 2013, pp. 48-62.

[37] A. Tang, S. Sethumadhavan, and S. Stolfo, "Heisenbyte: Thwarting memory disclosure attacks using destructive code reads," in ACM Conference on Computer and Communications Security, 2015, pp. 256-267.

[38] P. Team. (2015, September) Pax address space layout randomization (aslr).

[39] D. L. C. Thekkath, M. Mitchell, P. Lincoln, D. Boneh, J. Mitchell, and M. Horowitz, "Architectural support for copy and tamper resistant software," in International Conference on Architectural Support for Programming Languages and Operating Systems, 2000, pp. 168-177.

[40] D. Wagner and P. Soto, "Mimicry attacks on host-based intrusion detection systems," in ACM Conference on Computer and Communications Security, 2002, pp. 255-264.

[41] R. Wartell, Y. Zhou, K. W. Hamlen, M. Kantarcioglu, and B. Thuraisingham, "Differentiating code from data in x86 binaries," in Proceedings of the European Conference on Machine Learning and Knowledge Discovery in Databases, 2011, pp. 522-536.

[42] R. Wartell, V. Mohan, K. W. Hamlen, and Z. Lin, "Binary stirring: Self-randomizing instruction addresses of legacy x86 binary code," in ACM Conference on Computer and Communications Security, 2012, pp. 157-168.

It should be noted that CDPM 608 and/or functionality described herein may constitute a special purpose computing device. Further, CDPM 608 and/or functionality described herein can improve the technological field of computer security. For example, by using a NEAR memory permission primitive, just-in-time code reuse attacks can be prevented.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for preventing code reuse attacks, the method comprising:
    executing, on a processor, code in a memory page related to an application, wherein the memory page is protected by a memory protection unit (MPU);
    detecting a read request associated with the code; and
    after detecting the read request, modifying, by the MPU and without using a hypervisor, at least one memory permission associated with the memory page such that the code is no longer executable after the code is read.

2. The method of claim 1 comprising:
    performing the read request; and
    after performing the read request, modifying read code by changing at least one opcode in the read code.

3. The method of claim 1 wherein modifying the at least one memory permission includes modifying one or more bits of a memory register or a memory protection.

4. The method of claim 1 wherein the at least one memory permission includes a memory permission primitive of execute-no-read.

5. The method of claim 1 wherein detecting the read request associated with the code includes triggering a read exception or a fault for every memory page read.

6. The method of claim 1 comprising:
    prior to executing an executable binary, separating at least one data portion from an executable binary containing mixed executable code and data portions.

7. The method of claim 6 wherein separating the at least one data portion from the executable binary includes identifying and relocating function exports, function imports, jump tables, or local function variables.

8. The method of claim 7 wherein identifying the local function variables includes identifying gaps between known function code, after identifying the gaps, identifying references to data within these gaps, and performing a backwards disassembly to a first control-flow instruction.

9. The method of claim 7 wherein identifying the jump tables includes scanning a code section for clusters of two or more consecutive pointers in the code section and, for each cluster, scanning the code section for a jmp instruction referencing a pointer associated with the cluster.

10. A system for preventing code reuse attacks, the system comprising:
    at least one processor for executing code in a memory page related to an application, wherein the memory page is protected by a memory protection unit (MPU); and
    a MPU configured to detect a read request associated with the code and, after detecting the read request, to modify, by the MPU and without using a hypervisor, at least one memory permission associated with the memory page such that the code is no longer executable after the code is read.

11. The system of claim 10 wherein the MPU is configured to modify read code by changing at least one opcode in the read code after a read request is performed.

12. The system of claim 10 wherein the MPU is configured to modify the at least one memory permission by modifying one or more bits of a memory register or a memory protection key.

13. The system of claim 10 wherein the at least one memory permission includes a memory permission primitive of execute-no-read.

14. The system of claim 10 wherein the MPU is configured to trigger a read exception or a fault for every memory page read.

15. The system of claim 10 wherein the MPU is configured to separate at least one data portion from an executable binary containing mixed executable code and data portions prior to the executable binary being executed.

16. The system of claim 15 wherein the MPU is configured to identify and relocate function exports, function imports, jump tables, or local function variables contained in the executable binary.

17. The system of claim 16 wherein the MPU is configured to identify the local function variables by identifying gaps between known function code, after identifying the gaps, identifying references to data within these gaps, and performing a backwards disassembly to a first control-flow instruction.

18. The system of claim 16 wherein the MPU is configured to identify the jump tables by scanning a code section for clusters of two or more consecutive pointers in the code section and, for each cluster, scanning the code section for a jmp instruction referencing a pointer associated with the cluster.

19. A non-transitory computer readable medium having stored thereon executable instructions that when executed by a processor of a computer cause the computer to perform steps comprising:

executing, on a processor, code in a memory page related to an application, wherein the memory page is protected by a memory protection unit (MPU);

detecting a read request associated with the code; and after detecting the read request, modifying, by the MPU and without using a hypervisor, at least one memory permission associated with the memory page such that the code is no longer executable after the code is read.

20. The non-transitory computer readable medium of claim 19 having stored thereon executable instructions that when executed by the processor of the computer cause the computer to perform the read request and, after performing the read request, modifying read code by changing at least one opcode in the read code.

* * * * *